US011757858B2

(12) United States Patent
Buchanan et al.

(10) Patent No.: US 11,757,858 B2
(45) Date of Patent: Sep. 12, 2023

(54) ANALOG WAVEFORM MONITORING FOR REAL-TIME DEVICE AUTHENTICATION

(71) Applicant: Raytheon Company, Waltham, MA (US)

(72) Inventors: Amanda L. Buchanan, Simpsonville, SC (US); David A. Kwietniewski, Greenville, SC (US)

(73) Assignee: Raytheon Company, Waltham, MA (US)

( * ) Notice: Subject to any disclaimer, the term of this patent is extended or adjusted under 35 U.S.C. 154(b) by 455 days.

(21) Appl. No.: 16/854,621

(22) Filed: Apr. 21, 2020

(65) Prior Publication Data
US 2021/0328978 A1 Oct. 21, 2021

(51) Int. Cl.
*H04L 9/40* (2022.01)
*G06N 20/10* (2019.01)
*G06F 13/42* (2006.01)

(52) U.S. Cl.
CPC ............. *H04L 63/08* (2013.01); *G06F 13/42* (2013.01); *G06N 20/10* (2019.01)

(58) Field of Classification Search
CPC ................ H04L 63/08; H04L 63/1425; H04L 12/40189; H04L 2012/40215; H04L 2012/4028; H04L 67/12; G06F 13/42; G06F 17/148; G06N 20/10
See application file for complete search history.

(56) References Cited

U.S. PATENT DOCUMENTS

| | | | |
|---|---|---|---|
| 6,665,601 B1* | 12/2003 | Nielsen | H04L 12/40 710/60 |
| 8,825,188 B2 | 9/2014 | Stone et al. | |
| 10,588,021 B2 | 3/2020 | Shattil et al. | |
| 2015/0113638 A1* | 4/2015 | Valasek | G06F 21/562 726/22 |
| 2016/0188396 A1* | 6/2016 | Sonalker | G06F 11/079 714/37 |
| 2016/0197944 A1* | 7/2016 | Allouche | H04L 63/1416 726/23 |

(Continued)

OTHER PUBLICATIONS

International Search Report and Written Opinion of the International Searching Authority dated Jun. 11, 2021 in connection with International Patent Application No. PCT/US2021/021325, 8 pages.

*Primary Examiner* — Khoi V Le

(57) ABSTRACT

A method that includes operating a bus monitoring system having at least one interface configured to be coupled to at least one communication bus and receive bus traffic transmitted over the communication bus(es). The method also includes, using a device authentication system of the bus monitoring system, analyzing the bus traffic received via the at least one interface. Analyzing the bus traffic includes obtaining a message in the bus traffic (where the message identifies a source), identifying a support vector machine that corresponds to the source of the message, applying a wave transform to a waveform of the received message in order to generate a transformed waveform, inputting the transformed waveform to the identified support vector machine, and taking action in response to the identified support vector machine determining that the transformed waveform or the associated information does not correspond to the source.

20 Claims, 5 Drawing Sheets

(56) References Cited

U.S. PATENT DOCUMENTS

| | | |
|---|---|---|
| 2016/0366586 A1 | 12/2016 | Gross et al. |
| 2016/0366587 A1 | 12/2016 | Gross et al. |
| 2017/0153642 A1* | 6/2017 | Scheepjens ........... B60W 30/00 |
| 2017/0346794 A1 | 11/2017 | Gross et al. |
| 2018/0096595 A1* | 4/2018 | Janzen ................... G06V 10/94 |
| 2018/0131712 A1* | 5/2018 | Cornelio ................. H04L 63/14 |
| 2020/0018611 A1* | 1/2020 | Park ........................ G06F 16/29 |

* cited by examiner

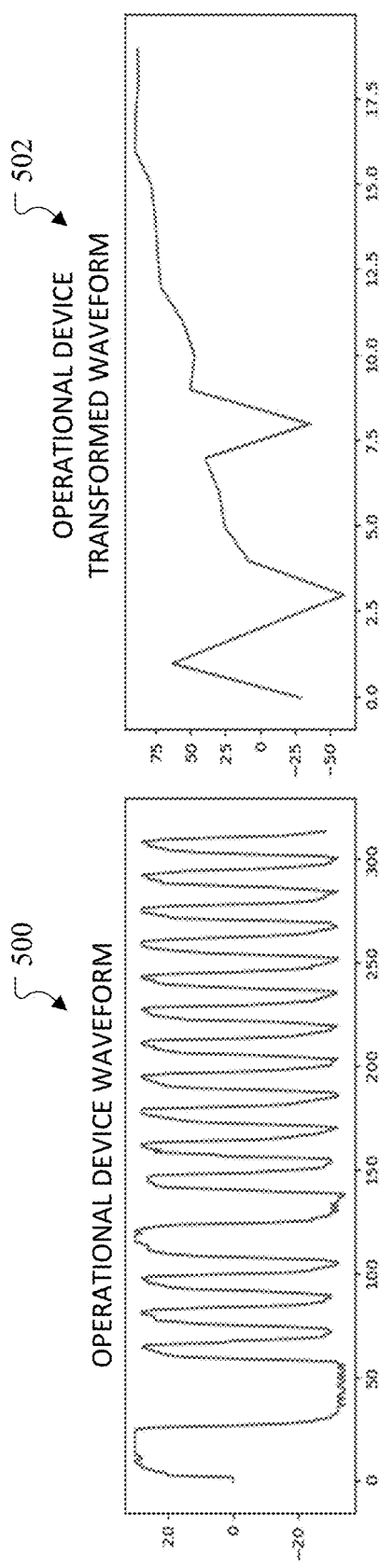
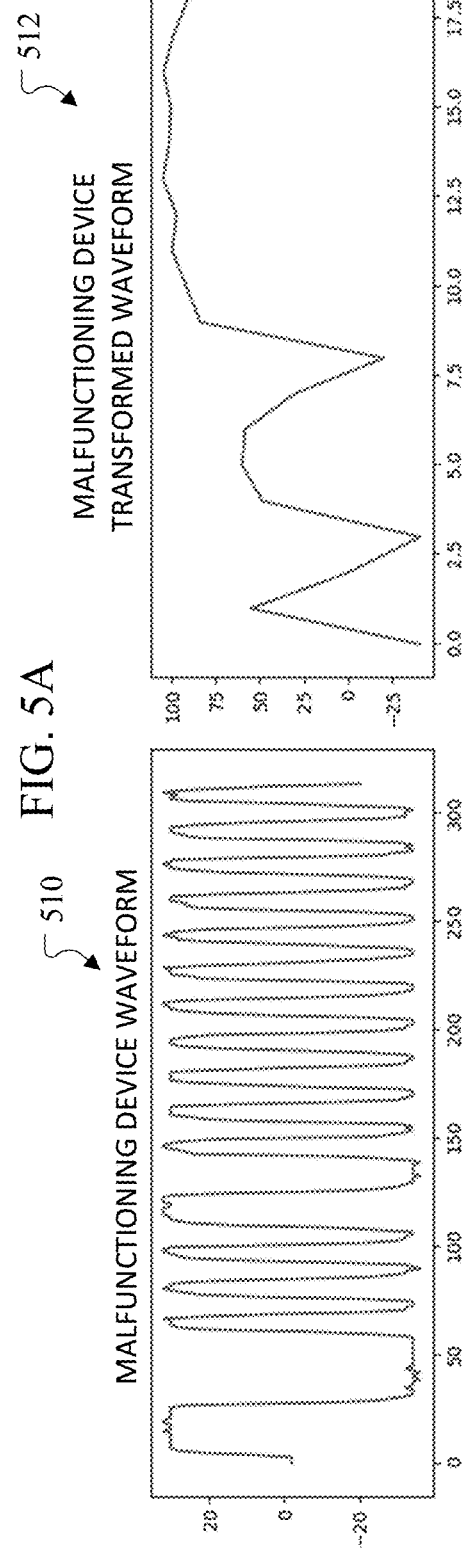
FIG. 5A
FIG. 5B

ANALOG WAVEFORM MONITORING FOR REAL-TIME DEVICE AUTHENTICATION

TECHNICAL FIELD

This disclosure relates generally to computer and network monitoring systems. More specifically, this disclosure relates to analog waveform monitoring for real-time device authentication.

BACKGROUND

Various types of aircraft, such as airplanes, cargo planes, helicopters, and tilt-rotor aircraft, use communication buses to facilitate communications between various subsystems and other components within the aircraft. For example, aircraft can use communication buses to transport data between cockpit displays, flight and embedded control systems, navigation systems, communication systems, and (in the case of military aircraft) targeting systems and weapons systems. The same or similar types of communication buses can also be used in satellites, radars, weapons management systems, and other systems.

SUMMARY

This disclosure provides analog waveform monitoring for real-time device authentication.

In a first embodiment, an apparatus includes at least one interface configured to be coupled to at least one communication bus, where the at least one interface is configured to receive bus traffic transmitted over the at least one communication bus. The apparatus also includes one or more processing devices configured to implement a device authentication system, where the device authentication system is configured to analyze the bus traffic received via the at least one interface. To analyze the bus traffic, the device authentication system is configured to obtain a message in the bus traffic, where the message identifies a source of the message. The device authentication system is also configured to identify a support vector machine that corresponds to the source of the message. The device authentication system is further configured to apply a wavelet transform to a waveform of the received message in order to generate a transformed waveform. The device authentication system is also configured to input the transformed waveform to the identified support vector machine. In addition, the device authentication system is configured to take action in response to the identified support vector machine determining that the transformed waveform does not correspond to the source of the message.

In a second embodiment, a method includes operating a bus monitoring system having at least one interface coupled to at least one communication bus, where the at least one interface is configured to receive bus traffic transmitted over the at least one communication bus. The method also includes, using a device authentication system of the bus monitoring system, analyzing the bus traffic received via the at least one interface. Analyzing the bus traffic includes obtaining a message in the bus traffic, where the message identifies a source of the message. Analyzing the bus traffic also includes identifying a support vector machine that corresponds to the source of the message. Analyzing the bus traffic further includes applying a wavelet transform to a waveform of the received message in order to generate a transformed waveform. Analyzing the bus traffic also includes inputting the transformed waveform to the identified support vector machine. In addition, analyzing the bus traffic includes taking action in response to the identified support vector machine determining that the transformed waveform does not correspond to the source of the message.

In a third embodiment, a non-transitory computer readable medium stores instructions that implement a device authentication system. The instructions when executed cause at least one processor to receive, via at least one interface configured to be coupled to at least one communication bus, bus traffic transmitted over the at least one communication bus. The instructions when executed also cause the at least one processor to analyze the bus traffic received via the at least one interface. The instructions that cause the at least one processor to analyze the bus traffic include instructions that cause the at least one processor to obtain a message in the bus traffic, where the message identifies a source of the message. The instructions that cause the at least one processor to analyze the bus traffic also include instructions that cause the at least one processor to identify a support vector machine that corresponds to the source of the message. The instructions that cause the at least one processor to analyze the bus traffic further include instructions that cause the at least one processor to apply a wavelet transform to a waveform of the received message in order to generate a transformed waveform. The instructions that cause the at least one processor to analyze the bus traffic also include instructions that cause the at least one processor to input the transformed waveform to the identified support vector machine. In addition, the instructions that cause the at least one processor to analyze the bus traffic include instructions that cause the at least one processor to take action in response to the identified support vector machine determining that the transformed waveform does not correspond to the source of the message.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which:

FIGS. 5A and 5B illustrate example waveforms and transformed waveforms for a properly-functioning device and a malfunctioning or malicious device in accordance with this disclosure.

DETAILED DESCRIPTION

Figure 1:
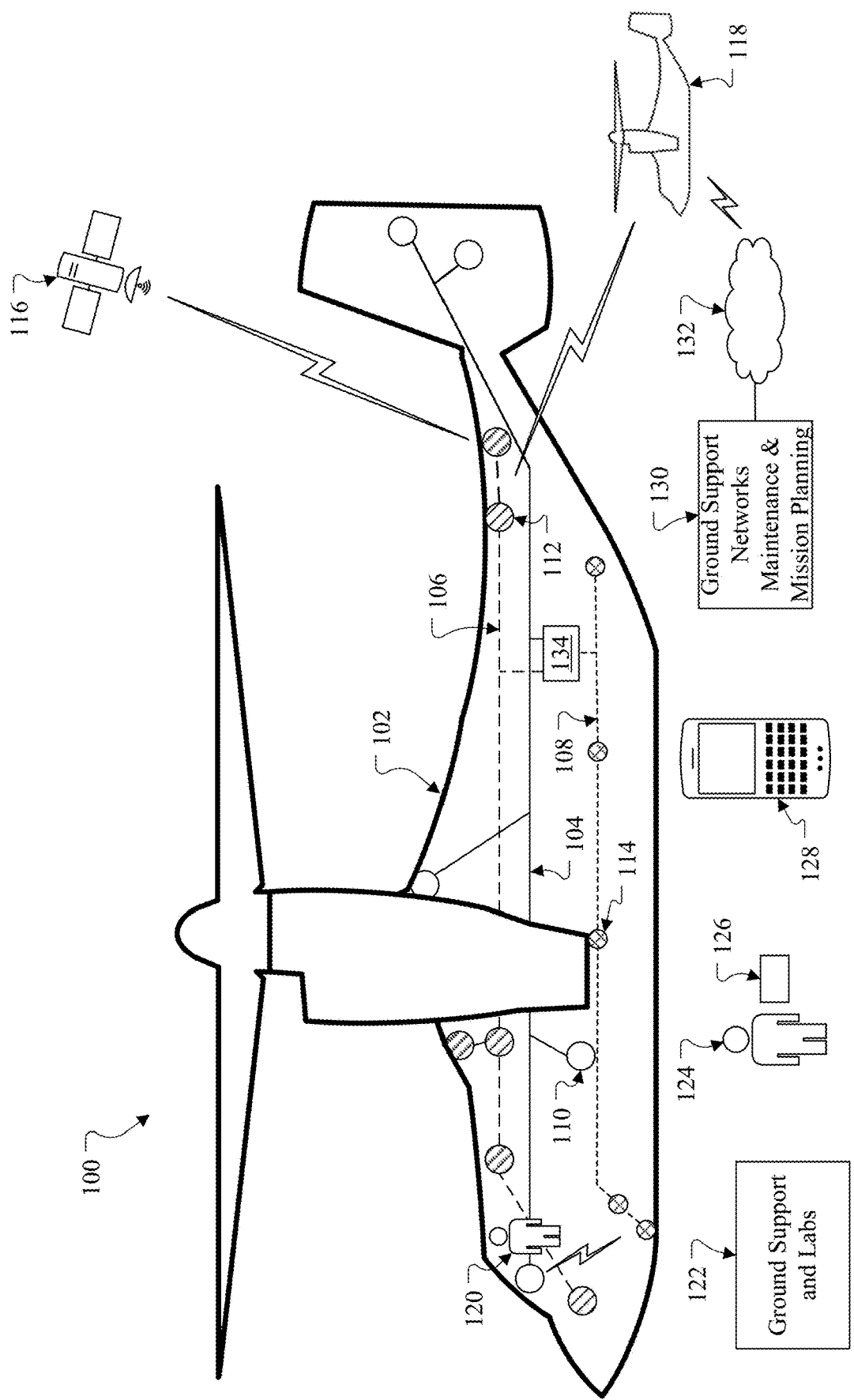
FIG. 1 illustrates an example system supporting bus monitoring for detecting anomalies in accordance with this disclosure.

FIGS. 1 through 6, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

As noted above, aircraft, satellites, radars, weapons management systems, and other systems typically include communication buses to facilitate communications between their various subsystems and other components. In an aircraft, for example, communication buses can be used to transport data between cockpit displays, flight and embedded control systems, navigation systems, communication systems, and targeting and weapons systems in military aircraft. Example types of communication buses include MIL-STD-1553B ("1553B") buses, MIL-STD-1760E ("1760E") buses, ARINC 429 buses, and Controller Area Network (CAN) buses. Unfortunately, these types of communication buses have been developed without regard for device authentication. These types of communication buses are therefore susceptible to faults, malware, or other exploits being injected into the communication buses, such as by compromised terminals or other compromised components. As a result, for instance, a defective component can often transmit defective signals over an entire communication bus and can often affect or infect any other components that are coupled to the communication bus.

This disclosure describes various techniques for bus monitoring, which can be used to detect anomalies that are indicative of conditions like malfunctions, defective components, or malicious activity. As described in more detail below, a bus monitoring system is used to aid in the detection of anomalies on 1553B buses, 1760E buses, ARINC 429 buses, CAN buses, and/or other avionics or other communication bus topologies. The bus monitoring system includes a data processing and analysis module that receives bus traffic over one or more communication buses and processes the bus traffic to identify errant transmissions or other errant bus behaviors. The 1553B protocol, for instance, has a well-defined set of behaviors that occur during normal operation, and the data processing and analysis module can analyze the bus traffic on a 1553B bus to identify situations that vary from those well-defined behaviors. The MIL-STD-1553B standard defines a serial communication protocol that includes the use of a single bus controller and multiple remote terminals. Note that in the following discussion below, the phrases "defective component" or "malfunctioning component" can refer to a component that is operating incorrectly or to an invasive or malicious component that is attempting to spoof another device, spam a communication bus, or perform other malicious activities.

The data processing and analysis module can process bus traffic concurrently or in any other suitable manner to support real-time analysis of the bus traffic. The data processing and analysis module can also support a wide variety of data processing algorithms to identify errant transmissions or other bus behaviors, such as analog analysis of waveforms and/or digital analysis of bus traffic. Further, special-purpose analysis techniques for specific avionics device types or other device types may be used in the data processing and analysis module, such as to provide inspection of bus traffic specific to certain types of avionics devices or other devices. Example types of avionics devices may include specific types of navigation systems (such as Global Positioning System or other satellite-based or other navigation systems), specific types of platform or weapons control systems, and specific types of external or internal communication systems.

The bus monitoring system also includes a physical access module that can host one or multiple physical communication adapters. The communication adapters can provide physical and logical interactions with one or multiple communication buses. The multiple communication buses may represent the same type of bus or different types or configurations of buses. For instance, communication adapters can provide physical and logical interactions with identical or different configurations of the same type of bus (like different configurations of 1553B buses and/or other types of buses) and/or with different types of buses (such as different 1553B, 1760E, ARINC 429, and/or CAN buses). In some embodiments, the bus monitoring system operates in a passive bus monitor mode to monitor bus traffic over one or more communication buses. In other embodiments, the bus monitoring system also has the ability to transmit traffic onto one or more communication buses, which can be done in support of device authentication, anomaly mitigation, or other functions.

In this way, a bus monitoring system can provide strict monitoring of 1553B bus transactions or other bus transactions. This can be done to detect malfunctions of the communication bus itself or malfunctions of components coupled to the bus. This can also or alternatively be done to detect the presence of faults, malware, or other exploits in components coupled to the communication bus. These functions can be performed in real-time, and the results can be used to notify one or more users (such as a pilot or other personnel on board an aircraft) of any detected non-compliant bus behavior in real-time. This functionality can be used in a number of applications, such as in military and safety-critical systems of aircraft, radars, satellites, and weapons management systems.

Moreover, there are various features of the bus monitoring system that enable its use in a variety of applications. For example, the option of using multiple physical interfaces helps to support the use of the bus monitoring system with multiple bus types and configurations, and the modular design of the bus monitoring system supports the interchangeability of hardware interfaces. Hardware abstraction allows the switching out of different interfaces in the bus monitoring system with little if any impact to the other components of the bus monitoring system. Example types of physical interfaces that may be supported include Peripheral Component Interconnect (PCI), PCI-x, Virtual Management Ethernet (VME), and Universal Serial Bus (USB) interfaces, and example types of bus interfaces that may be supported include 1553B standard twinax cable and Ethernet interfaces.

The configurability of the data processing and analysis module helps to support multiple analysis approaches, and a configurable number of processes for analyzing bus traffic concurrently can be provided in the bus monitoring system without impacting bus performance. The actual number of processes used in the bus monitoring system can be tunable, such as to balance the desired analysis needs against any size, weight, and power (SWaP) considerations of a host aircraft, vehicle, or other larger system. In addition, the use of certain features, such as standard Portable Operating System Interface (POSIX) interfaces, helps to make the bus monitoring system portable to multiple operating systems. Example operating systems may include commercial real-time operating systems (RTOS) and free and open-source embedded Linux operating systems. The use of standard interfaces may also allow the functionality of the bus monitoring system to be incorporated into existing systems without the need for additional hardware components. Thus, the bus monitoring system may be deployed in various ways, such as when a bus monitoring system is used to monitor one or multiple communication buses, when a bus monitoring system utilizes a direct connection to a communication bus, or when a bus monitoring system is used to support analysis of bus traffic delivered over Ethernet. Additional details of the bus monitoring system are provided below.

FIG. 1 illustrates an example system 100 supporting bus monitoring for detecting anomalies in accordance with this disclosure. As shown in FIG. 1, the system 100 includes an aircraft 102. In this particular example, the aircraft 102 represents a tilt-rotor aircraft, although the bus monitoring functionality may be used with other types of aircraft, such as fixed-wing aircraft or helicopters and other types of vehicles, such as cars, trucks, railroad cars, etc. Also, as noted above, the use of the bus monitoring functionality described in this patent document is not limited to use with just aircrafts. The bus monitoring functionality can also be used in manual control vehicles, semi-autonomous vehicles, and full-autonomous vehicles.

The aircraft 102 includes one or more avionics communication buses, which are used to transport information and signaling between various subsystems and other components of the aircraft 102. In this example, the aircraft 102 includes three communication buses 104, 106, 108, which may be used to transport information and signaling used for different purposes or functions on the aircraft 102. For example, the bus 104 may transport information and signaling between components 110 related to aircraft control. Aircraft control components 110 may include one or more cockpit displays, one or more flight and embedded control systems, one or more flight safety-related systems, and/or one or more navigation systems, such as a Global Positioning System (GPS) receiver or other satellite-based or other navigation receiver. The bus 106 may transport information and signaling between components 112 related to sensing and communications. Sensing and communications components 112 may include one or more systems used for satellite communications involving at least one satellite 116, line-of-sight (LOS) communications involving at least one other aircraft 118, various sensors on the aircraft 102, and/or equipment in at least one electro-optical/infrared (EO/IR) pod or other structure coupled to the aircraft 102. The bus 108 may transport information and signaling between components 114 related to at least one weapons system. Weapons system components 114 may include one or more targeting systems used to identify and lock onto targets, one or more stores management systems used to integrate fire control with aircraft sensors and mission management systems, and/or one or more "smart" weapons.

Note that an aircraft 102 may include any suitable number of communication buses, including a single communication bus. Also, each communication bus may be coupled to any suitable number(s) and type(s) of components and may be used to transport any suitable information and signaling between those components. Thus, the use of three communication buses 104, 106, 108 in FIG. 1 and the specific types of components 110, 112, 114 coupled to those buses are examples only. Further note that if multiple communication buses are used in an aircraft 102, the communication buses may or may not be isolated from one another. In the example in FIG. 1, the bus 106 may be isolated from the other buses 104 and 108, and the buses 104 and 108 may interact with one another. This may allow, for instance, a pilot 120 or other personnel to control the operation of or otherwise interact with one or more targeting systems, stores management systems, smart weapons, and/or other components 114 on the bus 108 via a component 110 on the bus 104. However, this is for illustration only, and any suitable arrangement of communication buses (whether or not isolated) may be used on the aircraft 102.

There are various ways in which faults, malware, or other exploits can enter one or more of the communication buses 104, 106, 108 and/or one or more of the components 110, 112, 114 of the aircraft 102. For example, personnel who work on the aircraft 102 may introduce exploits into one or more communication buses 104, 106, 108 or one or more components 110, 112, 114, such as via a defective personal device (like a defective Flash drive). One or more defective components 110, 112, 114 may be installed on or to the aircraft 102, and exploits may be injected onto one or more communication buses 104, 106, 108 or onto one or more other components 110, 112, 114. This may occur if a supply chain for any of the components 110, 112, 114 has been compromised.

Ground support equipment 122 generally represents equipment used to service aircraft 102 between flights and to evaluate one or more aspects of the aircraft 102. Exploits may be injected into one or more communication buses 104, 106, 108 or one or more components 110, 112, 114 when the ground support equipment 122 is used with the aircraft 102. Service personnel 124 using service instruments 126 may perform maintenance on the aircraft 102. Exploits may be injected into one or more communication buses 104, 106, 108 or one or more components 110, 112, 114 through the service instruments 126 or other devices used by the service personnel 124. Handheld devices 128 may be used to load data into or record data from the aircraft 102. Defects may be introduced into one or more communication buses 104, 106, 108 or one or more components 110, 112, 114 through the handheld devices 128.

Ground support networks, maintenance, and mission planning systems 130 may be used to schedule or otherwise assist with ground support operations, maintenance operations, or mission planning operations. Defects may be introduced into one or more communication buses 104, 106, 108 or one or more components 110, 112, 114 through the systems 130. The systems 130 may also communicate (possibly via one or more networks 132) with other aircraft 118. Defects may be introduced laterally from the other aircraft 118 into one or more communication buses 104, 106, 108 or one or more components 110, 112, 114 of the aircraft 102. In addition, the aircraft 102 can communicate with one or more satellites 116, such as for navigation purposes or communication purposes. Defects may be introduced into one or more communication buses 104, 106, 108 or one or more components 110, 112, 114 through the satellites 116.

Defects may negatively affect various aspects of the aircraft 102. For example, defective signal transmitted over one or more communication buses 104, 106, 108 or one or more components 110, 112, 114 may prevent certain components 110, 112, 114 from operating correctly and performing desired functions. As particular examples, exploits may infect a landing gear controller to prevent proper raising or lowering of landing gear, infect a weapons controller to prevent proper targeting or firing of weapons, or infect a navigation system to prevent proper geolocation of the aircraft 102. Also, exploits injected into one or more communication buses 104, 106, 108 or one or more components 110, 112, 114 may interfere with proper communications over the bus(es). Further, exploits injected into one or more communication buses 104, 106, 108 or one or more components 110, 112, 114 may allow for reconnaissance by an external actor (such as surreptitiously enumerating the types and configurations of components attached to a bus), attempts to "pivot" within the system 100 and exploit another component 110, 112, 114 attached to a bus 104, 106, 108, or covert communications between deployed malicious agents in the system 100.

As described in more detail below, at least one bus monitoring system 134 may be used with the aircraft 102 to detect anomalies. A bus monitoring system 134 may be used with a single communication bus 104, 106, 108, in which case the aircraft 102 may include a bus monitoring system 134 for each bus 104, 106, 108.

Also or alternatively, a bus monitoring system 134 may be used with multiple communication buses 104, 106, 108. In response to detecting errant behavior on at least one communication bus 104, 106, 108, the bus monitoring system 134 may alert the pilot 120 or other personnel or take other suitable corrective action.

Also as described in more detail below, the bus monitoring system 134 can be modular and may include a physical access module and a data processing and analysis module. The physical access module may include one or multiple interfaces that can be coupled to one or multiple communication buses 104, 106, 108, which allows the bus monitoring system 134 to monitor traffic being transported over one or multiple buses. The data processing and analysis module processes bus traffic received over one or more buses 104, 106, 108 (possibly in real-time) to identify errant bus behaviors. The errant bus behaviors may, for instance, be indicative of malfunctions associated with one or more components 110, 112, 114 or the presence of one or more malicious components 110, 112, 114. Various analysis algorithms may be supported by the bus monitoring system 134, including special-purpose analysis techniques for specific device types. In this way, the bus monitoring system 134 can help to protect the aircraft 102 against various threats, including malfunctions and malicious components.

Although FIG. 1 illustrates one example of a system 100 supporting bus monitoring for detecting anomalies, various changes may be made to FIG. 1. For example, components can be added, omitted, combined, further subdivided, replicated, or placed in any other suitable configuration according to particular needs. Also, the makeup and arrangement of components on the aircraft 102 are for illustration only, and this disclosure does not limit the bus monitoring functionality to any specific environment.

Figure 2:
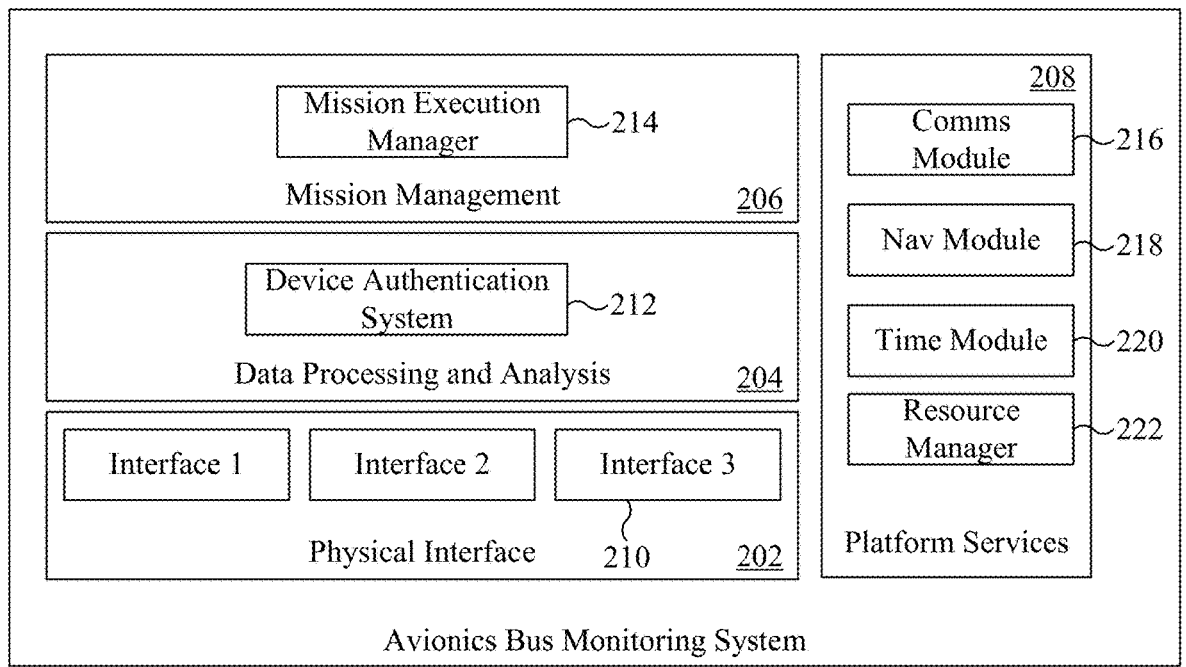
FIG. 2 illustrates an example bus monitoring system for detecting anomalies in accordance with this disclosure.

FIG. 2 illustrates an example bus monitoring system 134 for detecting anomalies in accordance with this disclosure. For ease of explanation, the bus monitoring system 134 shown in FIG. 2 is described as being used in the aircraft 102 of FIG. 1 to monitor traffic over at least one of the communication buses 104, 106, 108 of FIG. 1. However, the bus monitoring system 134 may be used with any other suitable communication bus(es) and in any other suitable environment.

As shown in FIG. 2, the bus monitoring system 134 is implemented using a modular design and includes a physical interface module 202, a data processing and analysis module 204, a mission management module 206, and a platform services module 208. Note that while four modules are shown here, the bus monitoring system 134 may be implemented using any other suitable numbers of modules. Also, in other embodiments, the bus monitoring system 134 need not be modular, and the components of the bus monitoring system 134 may be integrated.

The physical interface module 202 generally operates to support communications over one or more communication buses. In this example, the physical interface module 202 includes multiple interfaces 210 that enable the bus monitoring system 134 to be coupled to multiple communication buses in order to allow monitoring of the traffic transported over those communication buses. Depending on the circumstances, the physical interface module 202 may be coupled to a single communication bus through one of the interfaces 210, or the physical interface module 202 may be coupled to multiple communication buses through multiple ones of the interfaces 210. As a particular example, the multiple interfaces 210 may be used to couple the bus monitoring system 134 to at least one redundant pair of communication buses, such as a redundant pair of 1553B buses. Note that while three interfaces 210 are shown in FIG. 2, the physical interface module 202 may include any suitable number of interfaces 210 depending on the implementation, including one interface 210, two interfaces 210, or more than three interfaces 210.

Each interface 210 supports physical and logical interactions with a communication bus, such as a bus 104, 106, 108 of the aircraft 102. Multiple interfaces 210 may be coupled to multiple instances of the same type of communication bus or to different types or configurations of communication buses. As a particular example, different interfaces 210 may be used to receive analog waveforms and digital data over different buses, supporting multiple analysis approaches for analyzing bus traffic. Each interface 210 includes any suitable structure configured to be coupled to a communication bus and at least receive data (and possibly transmit data) over the communication bus. Example types of interfaces 210 may include 1553B, 1760E, ARINC 429, and CAN interfaces.

The data processing and analysis module 204 generally operates to analyze bus traffic and identify errant bus behaviors. In this example, the data processing and analysis module 204 includes a device authentication system 212, which receives bus traffic sent over one or more communication buses via one or more of the interfaces 210. The device authentication system 212 also analyzes the bus traffic to identify errant transmissions or other errant bus behaviors, which may be indicative of malfunctions, malicious actions, or other issues. As noted above, for example, the 1553B protocol has a well-defined set of behaviors that occur during normal operation, and the device authentication system 212 can analyze bus traffic on a 1553B bus to identify situations that vary from those well-defined behaviors. As described below, for instance, the device authentication system 212 may use various support vector machines (SVMs) to analyze bus traffic message waveforms and determine whether bus traffic messages appear to have originated from their identified sources.

In some embodiments, the device authentication system 212 supports concurrent processing of bus traffic from one or more communication buses. For instance, the device authentication system 212 may support different processes that apply different policies to the bus traffic received over one communication bus or over multiple communication buses. This helps to support real-time monitoring by the bus monitoring system 134. Real-time monitoring may be necessary or desirable in various applications, such as to support flight safety. Real-time monitoring also allows the device authentication system 212 to provide real-time anomaly reporting. Further, in some embodiments, the device authentication system 212 supports a scalable number of processes to implement the device authentication functionality and other functionality. For example, multiple analysis processes may be executed concurrently, and the multiple analysis processes may support the same analyses or different analyses for different communication buses. One or more additional processes may be used to support other functions of the device authentication system 212, such as a process for reporting detected anomalies to a pilot 120 or other personnel. Additional details regarding the device authentication system 212 are provided below.

Also, in some embodiments, the data processing and analysis module 204 may include or support a hardware abstraction layer, which enables standard interactions to occur via the various interfaces 210 regardless of the actual communication bus or buses coupled to the interfaces 210. This can help to reduce or minimize the impacts associated with different communication buses to other components of the bus monitoring system 134. This can also help support the modular nature of the bus monitoring system 134 by allowing different physical interface modules 202 or different interfaces 210 to be used. As noted above, for instance, hardware abstraction allows the switching out of different interfaces 210, such as different types of physical interfaces (like PCI, PCI-x, VME, and USB interfaces) and different types of bus interfaces (like 1553B standard twinax cable and Ethernet interfaces).

The mission management module 206 generally controls the overall operation of the bus monitoring system 134 and the interactions between the bus monitoring system 134 and external systems. In this example, the mission management module 206 includes a mission execution manager 214, which acts as the primary interface with other external systems (such as an external mission management/command and control system that controls the bus monitoring system 134). In some embodiments, the mission management module 206 may receive configuration data for the bus monitoring system 134, such as one or more policies defining at least some of the bus behaviors considered to be errant. The mission management module 206 may also receive data controlling which analyses are performed by the device authentication system 212 and when those analyses occur. The device authentication system 212 may further report errant behaviors detected by the device authentication system 212 to the mission management/command and control system. In other embodiments, the mission management module 206 may control the bus monitoring system 134 autonomously. In addition, the mission management module 206 may initiate, monitor, and terminate various processes that implement the device authentication system 212 or other functions of the bus monitoring system 134.

The platform services module 208 generally supports various additional functions needed or used by the bus monitoring system 134. In this example, the platform services module 208 includes a communications module 216, a navigation module 218, a time module 220, and a resource manager 222. The communications module 216 enables the bus monitoring system 134 to communicate with one or more external components separate from the bus(es) coupled to the interfaces 210. The navigation module 218 enables the bus monitoring system 134 to receive navigation-related data, such as from a GPS or other navigation receiver of the aircraft 102. The time module 220 enables the bus monitoring system 134 to generate or obtain a clock signal or other timing data. The resource manager 222 manages processing, memory, or other resources used by the bus monitoring system 134. In some embodiments, services offered by the components of the platform services module 208 may be accessible using Application Programming Interface (API) calls, such as C API calls.

The various components of the bus monitoring system 134 can support one or more standard interfaces, to make the bus monitoring system 134 portable to multiple operating systems. Example operating systems may include commercial RTOS, free and open-source embedded Linux operating system, or other types of operating systems. This helps to increase the portability of the bus monitoring system 134 to a wide range of possible installations.

In some embodiments, each of the modules 202-208 may support the execution of separate processes, and different processes may communicate with each other and with external systems in various ways. For example, different processes may use inter-process communication (IPC) channels, such as mailboxes or queues, to communicate and exchange data. As another example, different processes may use a shared memory space to communicate and exchange data. Among other things, the IPC channels, shared memory space, or other mechanisms can be used to support queuing and processing of commands and bus traffic by the device authentication system 212 and the sharing of processing results from the device authentication system 212.

The actual number of processes used in the bus monitoring system 134 can be tunable, such as to balance the desired analysis needs against any SWaP considerations. When the device authentication system 212 initiates monitoring, a configurable number of specified analysis processes can be executed to properly monitor bus traffic for anomalies. The ability to support multiple processes here, including multiple analysis processes, may help to ensure continued or more reliable bus monitoring or management, even in the event of a failure of a communication or analysis process.

As noted above, the device authentication system 212 can use various policies to identify which bus traffic is considered errant, and the various policies may also control how errant bus behavior is reported or otherwise handled. The policies used by the device authentication system 212 can vary widely based on a number of factors, such as the bus or buses being monitored. Also, the policies used by the device authentication system 212 can vary over time, such as when certain policies are used during different aspects or uses of an aircraft 102 or other system.

In some embodiments, the device authentication system 212 can use policies to perform one or more of the following functions. The device authentication system 212 may inspect command or data messages associated with various bus transactions for specific types of anomalies related to those bus transactions. The device authentication system 212 may also inspect waveforms generated by different components coupled to a bus in order to detect whether one component is attempting to improperly function as a bus controller or other type of device on the bus. The device authentication system 212 may further inspect multiple bus transactions over time to detect specific patterns of anomalies extending over multiple bus transactions. In addition, the device authentication system 212 may emulate a bus controller to send a variety of commands and data transfer requests to other components coupled to a bus in order to characterize those bus components and their responses to various conditions.

Note that these are examples only and that various policies may be defined to identify a wide variety of bus behaviors as errant. In many cases, the specific policies being used will typically depend on the specific type(s) and configuration(s) of the communication bus(es) being monitored, the components that are coupled to the bus(es) being monitored, and how the bus(es) and the bus components are being used. The examples given above are merely illustrative of the types of policies that may be used by the device authentication system 212. However, the device authentication system 212 is not limited to use with these types of policies.

Although FIG. 2 illustrates one example of a bus monitoring system 134 for detecting anomalies, various changes may be made to FIG. 2. For example, components can be added, omitted, combined, further subdivided, replicated, or placed in any other suitable configuration according to particular needs. Also, the makeup and arrangement of the different modules in the bus monitoring system 134 and of the bus monitoring system 134 itself are for illustration only, and this disclosure does not limit the bus monitoring functionality to this specific implementation.

Figure 3:
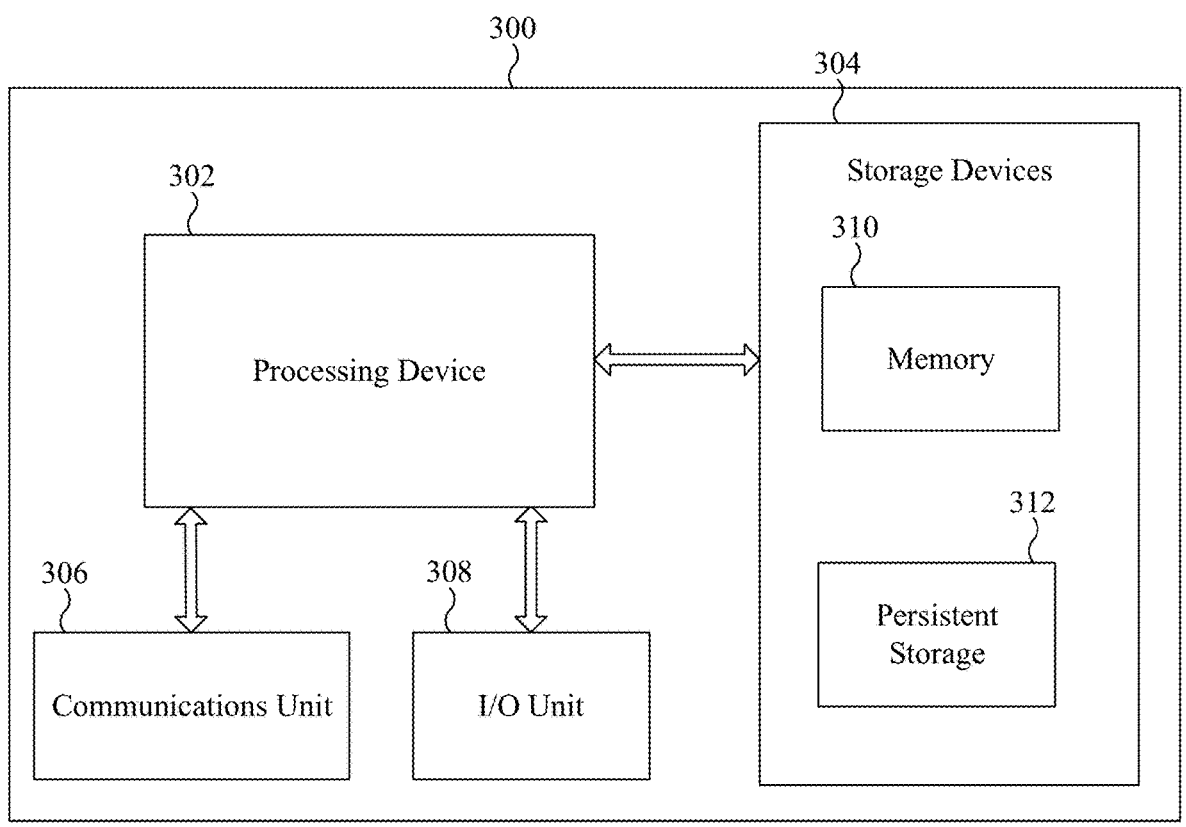
FIG. 3 illustrates an example processing system for performing device authentication in a bus monitoring system to detect anomalies in accordance with this disclosure.

FIG. 3 illustrates an example processing system 300 for performing device authentication in a bus monitoring system to detect anomalies in accordance with this disclosure. In particular, the processing system 300 shown in FIG. 3 may be used to execute or otherwise provide at least some of the functionality of the bus monitoring system 134. For instance, the processing system 300 may be used to execute at least the processes of the device authentication system 212 in order to process bus traffic and detect anomalies. For ease of explanation, the processing system 300 shown in FIG. 3 is described as being used with the bus monitoring system 134 of FIG. 2 in the aircraft 102 of FIG. 1 to monitor traffic over at least one of the communication buses 104, 106, 108. However, the processing functionality of the bus monitoring system 134 may be implemented in any other suitable manner, and the bus monitoring system 134 may be used with any other suitable communication bus(es) and in any other suitable environment.

As shown in FIG. 3, the processing system 300 denotes a computing device or system that includes at least one processing device 302, at least one storage device 304, at least one communications unit 306, and at least one input/output (I/O) unit 308. The processing device 302 may execute instructions that are loaded into a memory 310. The instructions can include instructions for processing bus traffic to identify anomalies indicative of malfunctions, malicious actions, or other issues. The processing device 302 includes any suitable number(s) and type(s) of processors or other devices in any suitable arrangement. Example types of processing devices 302 include microprocessors, microcontrollers, digital signal processors (DSPs), application-specific integrated circuits (ASICs), field programmable gate arrays (FPGAs), and discrete circuitry.

The memory 310 and a persistent storage 312 are examples of storage devices 304, which represent any structure(s) capable of storing and facilitating retrieval of information (such as data, program code, and/or other suitable information on a temporary or permanent basis). The memory 310 may represent a random access memory or any other suitable volatile or non-volatile storage device(s). The persistent storage 312 may contain one or more components or devices supporting longer-term storage of data, such as a read only memory, hard drive, Flash memory, or optical disc.

The communications unit 306 supports communications with other systems or devices. For example, the communications unit 306 can include at least one network interface card or at least one wireless transceiver facilitating communications over one or more wired or wireless networks. The communications unit 306 may also include the one or more interfaces 210, which allows the processing system 300 to communicate over one or more communication buses like the bus(es) 104, 106, 108. The communications unit 306 may also support the communication of analysis results from the bus monitoring system 134. The communications unit 306 may support communications through any suitable physical or wireless communication link(s).

The I/O unit 308 allows for input and output of data. For example, the I/O unit 308 may provide a connection for user input through a keyboard, mouse, keypad, touchscreen, or other suitable input device. The I/O unit 308 may also send output to a display, printer, or other suitable output device. As a particular example, the I/O unit 308 may be used to receive input data (such as user selections) for the bus monitoring system 134 and to provide output data (such as alerts or other results from the device authentication system 212). Note, however, that there may be little or no need for local I/O if the bus monitoring system 134 is implemented or installed remotely from any users, in which case the I/O unit 308 may be omitted.

Although FIG. 3 illustrates one example of a processing system 300 for performing device authentication in a bus monitoring system to detect anomalies, various changes may be made to FIG. 3. For example, any other suitable hardware implementation or hardware and software/firmware implementation may be used to implement the functionality of the bus monitoring system 134 in general or the device authentication system 212 in particular. Also, computing devices and systems come in a wide variety of configurations, and FIG. 3 does not limit this disclosure to any particular computing device or system.

Figure 4:
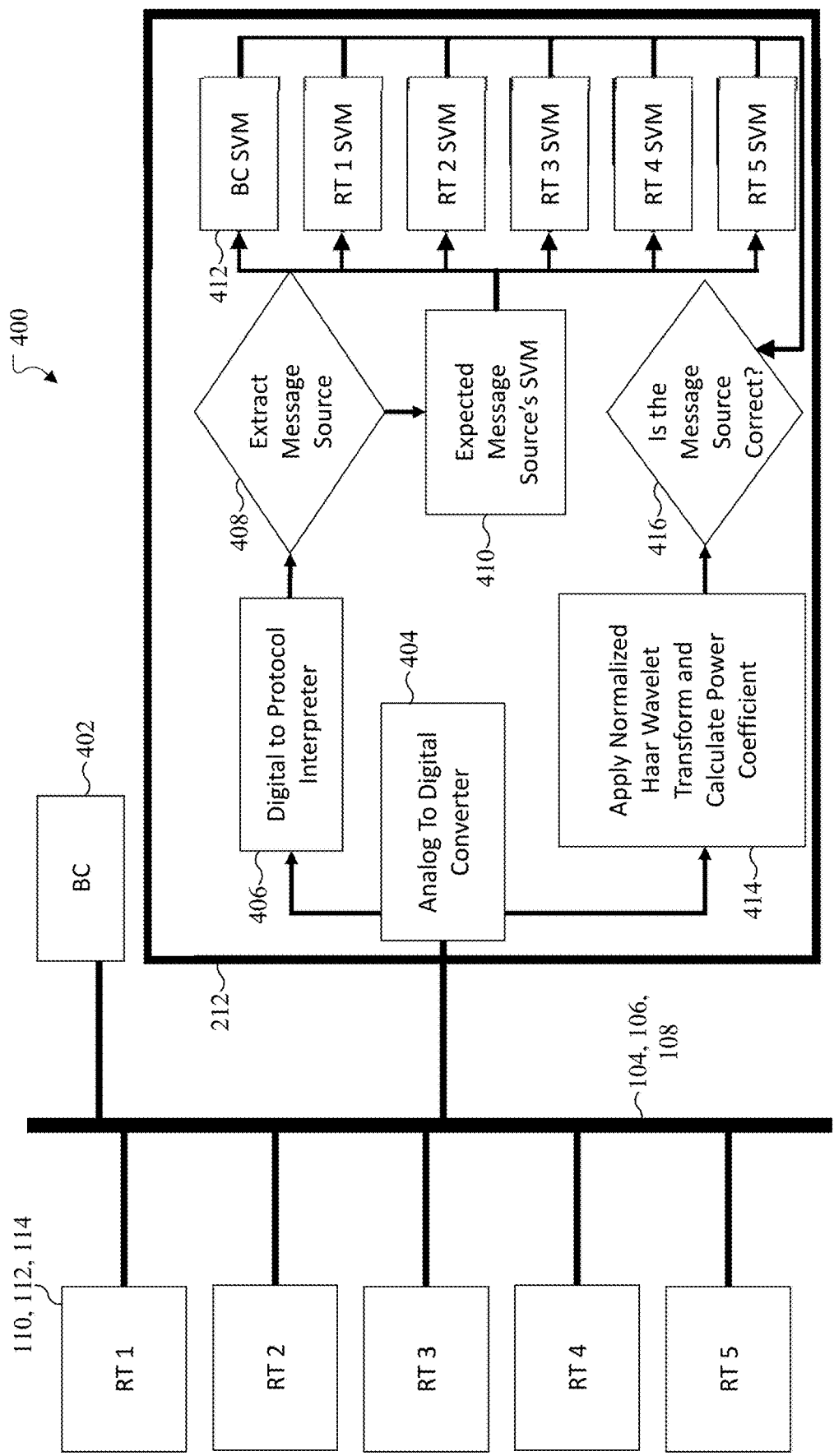
FIG. 4 illustrates an example architecture for a device authentication system in a bus monitoring system to detect anomalies in accordance with this disclosure.

FIG. 4 illustrates an example architecture 400 for a device authentication system 212 in a bus monitoring system 134 to detect anomalies in accordance with this disclosure. For ease of explanation, the architecture 400 of the device authentication system 212 shown in FIG. 4 is described as being used with the bus monitoring system 134 of FIG. 2 in the aircraft 102 of FIG. 1 to monitor traffic over at least one of the communication buses 104, 106, 108. However, the device authentication system 212 may be implemented in any other suitable manner, and the device authentication system 212 may be used with any other suitable communication bus(es) and in any other suitable environment.

As shown in FIG. 4, the device authentication system 212 is used in conjunction with one or more components 110, 112, 114 (such as one or more remote terminals) coupled to one or more communication buses 104, 106, 108. The device authentication system 212 here includes at least one bus controller (BC) 402, which can send a variety of commands and data transfer requests to other components to characterize those components and their responses. The actual operations of the bus controller(s) 402 are often defined based on the type(s) of communication bus(es) being used.

The device authentication system 212 also includes an analog-to-digital converter 404 and various functions or operations that can be performed by, for example, the processing device 302. The functions or operations here include operations 406-410 and 414-416, as well as multiple support vector machines (SVMs) 412. Overall, the device authentication system 212 can monitor various messages sent over at least one bus 104, 106, 108 to authenticate that each message is sent from a valid source corresponding to the message. For example, in some embodiments, the number of support vector machines 412 can equal the number of bus components 110, 112, 114 being monitored, and each bus component can have an associated support vector machine 412 that is trained to recognize messages sent from that bus component. A message that comes from (or appears to come from) a specific bus component can be processed using that bus component's support vector machine 412, which can determine whether the message likely did or did not come from the associated bus component.

The analog-to-digital converter 404 can receive one or more messages from the at least one bus 104, 106, 108 and convert each message into a digital waveform. For example, each message can be converted from an analog waveform to a digital waveform for analysis by the processing device 302. In some embodiments, the analog-to-digital converter 404 can sample buses operating at speeds of up to one megabyte per second, although buses operating at other speeds may be sampled. Note that the analog-to-digital converter 404 may actually sample at a sampling speed that is a multiple of the bus speed in order to create a high-fidelity digital waveform representing an analog signal. The analog-to-digital converter 404 includes any suitable structure configured to digitize analog signals.

Each digital waveform is provided to a digital-to-protocol interpreter function 406. The digital-to-protocol interpreter function 406 parses message data from the digital waveform based on a specified protocol (such as a 1553B, 1760E, ARINC 429, or CAN protocol) in order to identify one or more parsed fields of message data recovered from the digital waveform. Note that a single digital-to-protocol interpreter function 406 or multiple digital-to-protocol interpreter functions 406 may be used here, and the digital-to-protocol interpreter function(s) 406 can support any desired protocol(s). For each message being processed, the parsed message data is provided to an extraction function 408, which extracts at least the apparent source of the message. The apparent source represents the component 110, 112, 114 that provided the message being processed or at least the component 110, 112, 114 identified in the message as being the source.

An SVM selection function 410 selects one of the SVMs 412 for use in processing each message being analyzed. In the example architecture 400 here, the device authentication system 212 includes six SVMs 412, which correspond to the bus controller 402 and five components 110, 112, 114 on the at least one bus 104, 106, 108. For each message being processed, the extraction function 408 identifies the apparent source of the message, and the SVM selection function 410 identifies the SVM 412 associated with that source and routes the digital waveform to that SVM 412. Thus, for example, a message that appears to come from the bus controller 402 can have its digital waveform (or information about the digital waveform) sent to the SVM 412 associated with the bus controller 402. A message that appears to come from a specific one of the components 110, 112, 114, can have its digital waveform (or information about the digital waveform) sent to the SVM 412 associated with the component 110, 112, 114.

Each SVM 412 is trained to recognize messages sent from its associated component (bus controller 402 or component 110, 112, 114) relative to messages sent from other non-associated components. Thus, each SVM 412 can be trained to classify a digital waveform (or information about the digital waveform) as being likely from or not from its associated component. For example, each SVM 412 can be trained to determine whether an input is part of one class or another class, where one class represents messages from its associated component and another class represents messages from non-associated components.

In some cases, this can be expressed as follows. Each SVM 412 can be used to estimate the boundary of a high-dimensional distribution and can train one or more data models using data that has only one class. Thus, given training vectors $x_i \in R^n$ (where i=1, ..., l) without any class information, a one-class SVM may be determined as follows:

$$\min_{\omega,\xi,\rho} \frac{1}{2}\omega^T\omega - \rho + \frac{1}{\nu\ell}\sum_{i=1}^{\ell}\xi_i \quad (1)$$

$$\text{subject to } \omega^T\phi(x_i) \geq \rho - \xi_i \quad (2)$$

$$\xi_i \geq 0, 1 = 1, ..., \ell. \quad (3)$$

The dual problem can be expressed as:

$$\min_{\omega,\xi,\rho} \frac{1}{2}\alpha^T Q\alpha \quad (4)$$

$$\text{subject to } 0 \leq \alpha_i \leq \frac{1}{\nu\ell}, i = 1, ..., \ell \quad (5)$$

where $Q_{ij}=K(x_i,x_j)=\phi(x)^T\phi(xj)$. A decision function may be expressed as:

$$sgn(\Sigma_{i=1}{}^l \alpha_i K(x_i,x)-\rho) \quad (6)$$

In some embodiments, a scaled version of the one-class SVM can be defined as follows:

$$\omega,\xi,\rho^{min} \tfrac{1}{2}\alpha^T Q\alpha \quad (7)$$

$$\text{subject to } 0\leq\alpha_i\leq 1, i=1, ..., \ell \quad (8)$$

$$e^T\alpha = vl \quad (9)$$

Here, a radial basis kernel function K(x,y) can be used as the kernel function by the one-class SVM and may be defined by $K(x_i,x_j)=e^{(-\gamma*|xi-xj|2)}$, where $\gamma>0$ and $K(u,v)=e^{(-\gamma*|u-l2|)}$. The $\gamma$ value can typically be 1/(number of features), the v value can be a parameter value for a one-class SVM and represent a lower bound for a number of samples that are support vectors and an upper bound for a number of samples that are on the wrong side of a hyperplane, and the ε value can be a tolerance of a termination criterion used for training the SVM 412.

In the example shown in FIG. 4, for each message being processed, a transformed waveform is generated by a wave transform function 414 based on the digital waveform generated by the analog-to-digital converter 404. The wave transform function 414 can also calculate or identify various measurements or other characteristics associated with the transformed waveform, such as a power coefficient of the transformed waveform. The wave transform function 414 can use any suitable technique to generate the transformed waveform and identify its characteristic(s). In some embodiments, the wave transform function 414 can extract features from a digital waveform using a Haar wavelet transform. The transformed waveform can reduce a number or size of inputs into the appropriate SVM(s) 412 and can accentuate small differences in the signals sent by different bus components. As a particular example, a set of coefficients that captures both time and frequency of the digital signal can be generated and used as the transformed waveform. Different levels of the Haar wavelet transform can produce different numbers of coefficients and can be used to tune a classifier. In some embodiments, a fourth-level Haar wavelet transform with separate power coefficients may be used to analyze a signal from a bus, although other transforms may be used.

An authentication function 416 determines whether the message source in each message being processed appears correct based on a classification or other analysis of the transformed waveform of that message by the appropriate SVM 412. For instance, for each message, the authentication function 416 can provide the transformed waveform of that message to the selected SVM 412 determined to correspond to the source of the message, where the source of the message is identified by the extraction function 408 and the SVM 412 is selected by the SVM selection function 410. The selected SVM 412 analyzes the transformed waveform and classifies the transformed waveform as either (i) likely being from the associated source or (ii) likely not being from the associated source. The selected SVM 412 here may use various characteristics of the transformed waveform when making this determination, such as the shape of the transformed waveform, a magnitude of the transformed waveform, and/or a number of peaks in the transformed waveform. The classification made by the selected SVM 412 is used by the authentication function 416 to authenticate the message or flag the message as not being authenticated.

If the authentication function 416 receives an indication from an SVM 412 that a message asserting to be from a specific source cannot be authenticated, the authentication function 416 may trigger one or more actions in response. For example, the authentication function 416 can initiate one or more corrective measures depending on the system. For example, the authentication function 416 may cause a notification to be transmitted to a pilot 120 or other personnel. The personnel may then elect to shut down or isolate a specific bus component, investigate further, or perform some other actions. The authentication function 416 may also provide the transformed waveform for the unauthenticated message to all other SVMs 412 in order to see if the unauthenticated message might have come from a different bus component (which may be indicative of a fault or malicious activity). Any other suitable corrective action might occur here.

Each SVM 412 can be trained to recognize messages from its associated bus component (such as a bus controller 402 or other bus component 110, 112, 114) while distinguishing messages from other bus components in any suitable manner. For example, when a system 100 is in a known good configuration (such as with no malfunctioning or malicious bus components), each bus component may generate a message that is provided to all SVMs 412. For each message from a specific bus component, the SVM 412 associated with that bus component can be trained to classify that message as coming from its associated bus component, while all other SVMs 412 can be trained to classify that message as coming from an incorrect or non-associated bus component. Doing this over all of the bus components be monitored for a number of messages and message types can help to train each SVM 412 to distinguish its bus component from other bus components.

Although FIG. 4 illustrates one example of an architecture 400 for a device authentication system 212 in a bus monitoring system 134 to detect anomalies, various changes may be made to FIG. 4. For example, components in the architecture can be added, omitted, combined, further subdivided, replicated, or placed in any other suitable configuration according to particular needs. Also, a device authentication system 212 may be implemented in any other suitable manner.

FIGS. 5A and 5B illustrate example waveforms and transformed waveforms for a properly-functioning device and a malfunctioning or malicious device in accordance with this disclosure. For ease of explanation, the waveforms shown in FIGS. 5A and 5B are described as being used with the bus monitoring system 134 of FIG. 2 in the aircraft 102 of FIG. 1. However, the device authentication system 212 may generate any other suitable waveforms depending on the application and current conditions.

Physical differences in the interfaces of bus components and differences in the lengths of bus cables or other connections to, from, or between bus components can cause slight differences in analog waveforms produced by the bus components. This can hold true even if the bus components are generating and transmitting the exact same messages with the exact same contents over a bus. Thus, using a waveform transformation on received waveforms can help to accentuate any differences between analog waveforms transmitted over a bus by different bus components.

As shown in FIG. 5A, an example waveform 500 for a properly-functioning bus component may be received by the device authentication system 212. The device authentication system 212 can perform the wave transform function 414 on the waveform 500 to generate a transformed waveform 502 for the properly-functioning bus component. The transformed waveform 502 can be input to an SVM 412 that corresponds to the bus component that the waveform 500 allegedly came from (such as based on the source identified in the message from the bus component), and the SVM 412 can classify the transformed waveform 502 as likely coming from its associated bus component.

As shown if FIG. 5B, an example waveform 510 for a malfunctioning or malicious device may be received by the device authentication system 212. The device authentication system 212 can perform the wave transform function 414 on the waveform 510 to generate a transformed waveform 512 for the malfunctioning or malicious bus component. The transformed waveform 512 can be input to an SVM 412 that corresponds to the bus component that the waveform 510 allegedly came from (such as based on the source identified in the message from the bus component), and the SVM 412 can classify the transformed waveform 502 as not likely coming from its associated bus component.

Note that even though the waveforms 500 and 510 may appear similar, using a wave transformation on the waveforms 500 and 510 can highlight significant differences between the waveforms 500 and 510. Here, the malfunctioning or malicious bus component has a significantly different transformed waveform 512 compared to the transformed waveform 510 of the properly-functioning bus component. Thus, when the transformed waveform for one device is input to the SVM 412 associated with another device, the SVM 412 can classify the transformed waveform as not coming from its associated device.

Although FIGS. 5A and 5B illustrate examples of waveforms and transformed waveforms for a properly-functioning device and a malfunctioning or malicious device, various changes may be made to FIGS. 5A and 5B. For example, waveforms may be generated from any number of different components of a bus system, and the waveforms shown here are merely examples of the types of waveforms that might be generated.

Figure 6:
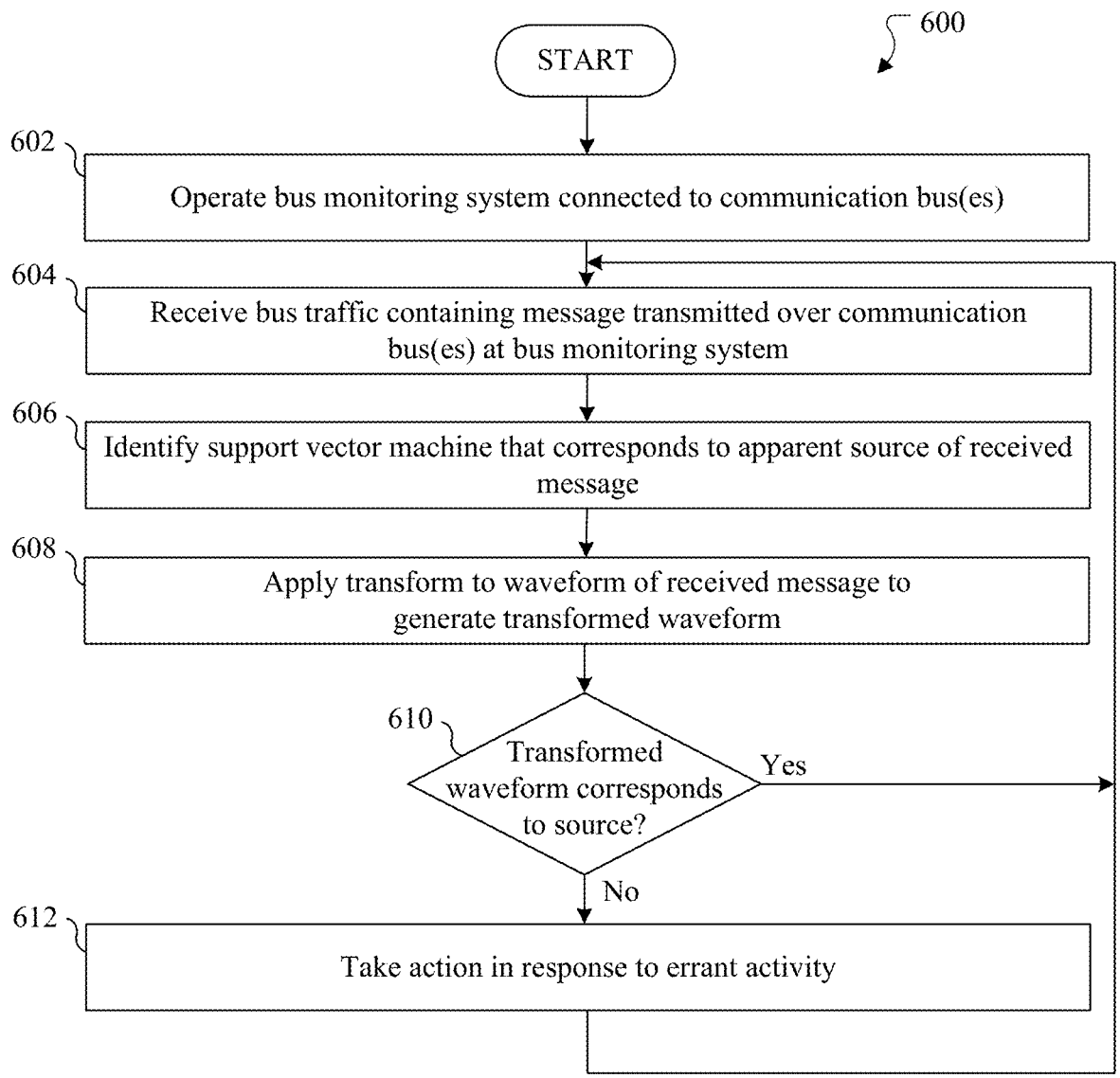
FIG. 6 illustrates an example method for bus monitoring to detect anomalies in accordance with this disclosure.

FIG. 6 illustrates an example method 600 for bus monitoring to detect anomalies in accordance with this disclosure. For ease of explanation, the method 600 shown in FIG. 6 is described as involving the use of the bus monitoring system 134 of FIG. 2 in the aircraft 102 of FIG. 1 to monitor traffic over at least one of the communication buses 104, 106, 108 of FIG. 1. However, the method 600 may involve the use of any other suitable bus monitoring system designed in accordance with this disclosure, which may be used to monitor any suitable communication bus(es) in any suitable environment.

As shown in FIG. 6, a bus monitoring system operates while connected to one or more communication buses at step 602. This may include, for example, the bus monitoring system 134 operating while connected to one or more buses 104, 106, 108 of the aircraft 102. This may also include one or more interfaces 210 of the bus monitoring system 134 providing physical and logical interactions needed to communicate over the one or more buses 104, 106, 108.

Bus traffic containing a message transmitted over a communication bus is received at the bus monitoring system at step 604. This may include, for example, one interface 210 of the bus monitoring system 134 receiving one or more data packets or other bus traffic over one of the buses 104, 106, 108 of the aircraft 102. The message in the bus traffic may include a command message, a status message, or another data message sent by one of the components 110, 112, 114 over the bus 104, 106, 108. The actual contents of the bus traffic can vary based on, among other things, the specific type(s) of bus(es) being monitored and the one or more components 110, 112, 114 coupled to the bus(es).

A support vector machine corresponding to an apparent source of the message is identified at step 606. This may include, for example, the device authentication system 212 of the bus monitoring system 134 obtaining the digital waveform of the message and applying the functions 406, 408 to the digital waveform in order to identify a source contained in the message. This may also include the device authentication system 212 of the bus monitoring system 134 applying the function 410 to identify the SVM 412 associated with the identified source contained in the message. A waveform transform is applied to the message at step 608. This may include, for example, the device authentication system 212 applying the function 414 to the digital waveform of the message to generate a normalized Haar wavelet transform or other waveform transform. A determination is made whether the transformed waveform corresponds to its apparent source at step 610. This may include, for example, the function 414 applying the transformed waveform to the selected SVM 412 and determining whether the selected SVM 412 returns an output indicating that the transformed waveform was likely provided by the bus component associated with the selected SVM 412. If so, the process can return to step 604 to process another message contained in bus traffic.

Otherwise, if the selected SVM 412 returns an output indicating that the transformed waveform was likely not provided by the bus component associated with the selected SVM 412, one or more actions may be taken in response to the detected errant bus behavior at step 612. This may include, for example, the bus monitoring system 134 generating an alert for a pilot 120 or other personnel onboard or associated with the aircraft 102. This may also include the device authentication system 212 providing the transformed waveform to all other SVMs 412 to see if another SVM 412 might be able to identify a possible source of the message. The device authentication system 212 also can identify a port on the bus that the message originated from. When the SVM 412 returns an output indicating that the transformed waveform was not likely provided by the bus component, the device authentication system can shut down the port on the bus that the message originated from. Again, the process can return to step 604 to process another message contained in bus traffic.

In certain embodiments, the device authentication system 212 can capture the health of the message bus. The health of the message bus can be determined upon startup of the bus or at a user requested time. The determination can be repeated at regular intervals. The device authentication system 212 can monitor the bus for a message from each of the components on the bus. The device authentication system 212 authenticates each device on the bus until every device has been identified. When the SVM 412 returns an output indicating that the transformed waveform was not likely provided by the bus component, the device authentication system 212 can pull additional messages for that specific component from the bus or transmit a request to the specific component to initiate a response message from that specific component on the bus. The device authentication system 212 can determine a specific component has been tampered with based on the SVM 412 not authenticating a specific component. The amount of iterations to determine that the specific component is not authentic can vary dependent on the implementation.

Although FIG. 6 illustrates one example of a method 600 for bus monitoring to detect anomalies, various changes may be made to FIG. 6. For example, while shown as a series of steps, various steps in FIG. 6 may overlap, occur in parallel, or occur any number of times.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
   at least one interface configured to be coupled to at least one communication bus, the at least one interface configured to receive bus traffic transmitted over the at least one communication bus; and
   one or more processing devices configured to implement a device authentication system, the device authentication system configured to analyze the bus traffic received via the at least one interface;
   wherein, to analyze the bus traffic, the device authentication system is configured to:
      obtain a message in the bus traffic, the message identifying a source that transmitted the message over the at least one communication bus;
      identify a support vector machine that corresponds to the source;
      apply a wavelet transform to a waveform of the received message in order to generate a transformed waveform;
      input the transformed waveform to the identified support vector machine; and
      take action in response to the identified support vector machine determining that the transformed waveform does not correspond to the source.

2. The apparatus of claim 1, wherein the wavelet transform is a Haar wavelet transform.

3. The apparatus of claim 1, wherein the device authentication system includes a support vector machine for each of multiple bus components coupled to the at least one communication bus.

4. The apparatus of claim 3, wherein each support vector machine is trained to identify messages sent from its respective bus component.

5. The apparatus of claim 4, wherein, to take action, the device authentication system is configured to input the transformed waveform to each support vector machine in order to determine a true source of the message.

6. The apparatus of claim 1, wherein the identified support vector machine is configured to determine whether the transformed waveform corresponds to the source based on at least one of: a waveform shape, a magnitude, and a number of peaks.

7. The apparatus of claim 1, wherein, to take action, the device authentication system is configured to transmit an alert to at least one specified user.

8. A method comprising:
   operating a bus monitoring system having at least one interface coupled to at least one communication bus, the at least one interface configured to receive bus traffic transmitted over the at least one communication bus; and
   using a device authentication system of the bus monitoring system, analyzing the bus traffic received via the at least one interface, wherein analyzing the bus traffic comprises:
      obtaining a message in the bus traffic, the message identifying a source that transmitted the message over the at least one communication bus;
      identifying a support vector machine that corresponds to the source;
      applying a wavelet transform to a waveform of the received message in order to generate a transformed waveform;
      inputting the transformed waveform to the identified support vector machine; and
      taking action in response to the identified support vector machine determining that the transformed waveform does not correspond to the source.

9. The method of claim 8, wherein the wavelet transform is a Haar wavelet transform.

10. The method of claim 8, wherein:
    multiple bus components are coupled to at least one of the at least one communication bus; and
    the device authentication system includes a support vector machine for each of the bus components.

11. The method of claim 10, wherein each support vector machine is trained to identify messages sent from its respective bus component.

12. The method of claim 11, wherein taking action comprises inputting the transformed waveform to each support vector machine in order to determine a true source of the message.

13. The method of claim 8, wherein the identified support vector machine is configured to determine whether the transformed waveform corresponds to the source based on at least one of: a waveform shape, a magnitude, and a number of peaks.

14. The method of claim 8, wherein taking action comprises transmitting an alert to at least one specified user.

15. A non-transitory computer readable medium storing instructions that implement a device authentication system, the instructions when executed causing at least one processor to:
    receive, via at least one interface configured to be coupled to at least one communication bus, bus traffic transmitted over the at least one communication bus; and
    analyze the bus traffic received via the at least one interface, wherein the instructions that cause the at least one processor to analyze the bus traffic comprise instructions that cause the at least one processor to:
       obtain a message in the bus traffic, the message identifying a source that transmitted the message over the at least one communication bus;
       identify a support vector machine that corresponds to the source;
       apply a wavelet transform to a waveform of the received message in order to generate a transformed waveform;
       input the transformed waveform to the identified support vector machine; and
       take action in response to the identified support vector machine determining that the transformed waveform does not correspond to the source.

16. The non-transitory computer readable medium of claim 15, wherein the wave transform is a Haar wavelet transform.

17. The non-transitory computer readable medium of claim 15, wherein the device authentication system includes a support vector machine for each of multiple bus components coupled to the at least one communication bus.

18. The non-transitory computer readable medium of claim 17, wherein each support vector machine is trained to identify messages sent from its respective bus component.

19. The non-transitory computer readable medium of claim 18, wherein the instructions that cause the at least one processor to take action comprise:
  instructions that cause the at least one processor to input the transformed waveform to each support vector machine in order to determine a true source of the message.

20. The non-transitory computer readable medium of claim 15, wherein the identified support vector machine is configured to determine whether the transformed waveform corresponds to the source based on at least one of: a waveform shape, a magnitude, and a number of peaks.

\* \* \* \* \*